(12) United States Patent
Gunderson et al.

(10) Patent No.: US 7,760,457 B1
(45) Date of Patent: Jul. 20, 2010

(54) RESONANT CHANNEL FOR HEAD-TO-DISC CONTACT VIBRATIONS

(75) Inventors: Neal Frank Gunderson, Lake Elmo, MN (US); Jason Wayne Riddering, Prior Lake, MN (US); John Stuart Wright, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 13 days.

(21) Appl. No.: 12/397,477

(22) Filed: Mar. 4, 2009

(51) Int. Cl.
*G11B 19/04* (2006.01)
*G11B 5/02* (2006.01)
*G11B 21/02* (2006.01)

(52) U.S. Cl. .................. 360/60; 360/25; 360/75
(58) Field of Classification Search ............ None
See application file for complete search history.

(56) References Cited

U.S. PATENT DOCUMENTS

| | | | |
|---|---|---|---|
| 4,056,163 A | 11/1977 | Wood et al. .......... 181/113 |
| 4,364,260 A | 12/1982 | Chen et al. .......... 73/35 |
| 5,095,396 A | 3/1992 | Putnam et al. .......... 360/106 |
| 6,234,021 B1 | 5/2001 | Piety et al. .......... 73/592 |
| 6,392,833 B1 | 5/2002 | Wood et al. .......... 360/73.03 |
| 6,674,601 B1 | 1/2004 | Ho .......... 360/75 |
| 6,888,694 B2 | 5/2005 | Guo et al. .......... 360/77.03 |
| 6,999,265 B1 | 2/2006 | Schreck et al. .......... 360/75 |
| 7,016,157 B1 | 3/2006 | Williams et al. .......... 360/265.7 |
| 7,411,752 B2 | 8/2008 | Angelo et al. .......... 360/75 |
| 7,420,778 B2 | 9/2008 | Sassine et al. .......... 360/244.9 |
| 2005/0057834 A1* | 3/2005 | Hirano et al. .......... 360/31 |
| 2010/0007983 A1* | 1/2010 | Funabashi et al. .......... 360/75 |
| 2010/0033860 A1* | 2/2010 | Tomita .......... 360/31 |

* cited by examiner

*Primary Examiner*—Andrew L Sniezek
(74) *Attorney, Agent, or Firm*—David C. Bohn; Westman, Champlin & Kelly, P.A.

(57) ABSTRACT

A channel senses head-to-disc contact vibrations in a vibrational noise spectrum produced in a mass storage device. The channel includes a suspension system with a suspension modal resonance. The channel includes a vibration sensor that senses head-to-disc contact vibrations through the suspension system. The vibration sensor has a sensor modal resonance that overlaps the suspension modal resonance.

20 Claims, 12 Drawing Sheets

RESONANT CHANNEL FOR HEAD-TO-DISC CONTACT VIBRATIONS

FIELD

The present invention relates generally to mass data storage devices, and more particularly but not by limitation to disc drives.

BACKGROUND

When head-to-disc contact vibration causes a head to align with a wrong track on a disc, data can be written on the wrong track, overwriting data that is lost. A channel is needed that can sense head-to-disc vibration quickly so that write current can be shut off, however, it is difficult to quickly sense head-to-disc contact vibration with adequate signal to noise ratio when there is a background vibration noise spectrum present that is produced by a pulse drive to a disc motor. The vibration noise spectrum is found to have local noise maxima that interfere with sensing head-to-disc contact vibrations.

Aspects of the present invention provide solutions to these and other problems, and offer other advantages over the prior art.

SUMMARY

Disclosed is a channel for use in a mass storage device. The channel senses head-to-disc contact vibrations. The mass storage device produces a vibrational noise spectrum characterized by first and second local maxima.

In certain embodiments, the channel comprises a suspension system. The suspension system suspends a head in relation to a disc. The suspension system has a suspension modal resonance that is spaced apart in frequency from the first and second local maxima.

In certain embodiments, the channel comprises a vibration sensor. The vibration sensor is coupled to sense head-to-disc contact vibrations through the suspension system. The vibration sensor has a sensor modal resonance that is spaced apart in frequency from the first and second local maxima. The sensor modal resonance overlaps with the suspension modal resonance.

Other features and benefits that characterize aspects of the channel will be apparent upon reading the following detailed description and review of the associated drawings.

DETAILED DESCRIPTION

In the Figures described below, a channel is used in a mass storage device that produces a vibrational noise spectrum characterized by first and second local maxima. The channel senses head-to-disc contact vibrations. The channel provides an output that is used to control a switch that interrupts write current to a write head when vibration above a threshold is detected. The channel quickly interrupts write current to prevent writing on a wrong track after a head-to-disc contact. The channel can also provide control of a heater. The heat produced by the heater controls adjustment of a head-to-disc spacing to reduce head-to-disc contact while maintaining a small enough magnetic air gap (head fly height) to provide read and write signals of adequate amplitude.

A disc motor spins one or more discs. The disc motor receives an electric pulse drive output that produces a vibration noise spectrum that has first and second local mechanical noise maxima. A head on a trailing edge of a slider is spaced from the disc by a fly height. The fly height of the slider is regulated by an aerodynamic lift force on a slider, and by a suspension force. The head is disposed on the slider. The heater adjacent the head heats the head to adjust the fly height of the head relative to the fly height of the slider. The adjustment avoids contact between the head and the disc, while maintaining a small enough air gap for reading and writing data. As explained in more detail below contacts between the head and disc are sensed fast enough to shut off write current before writing can erase data on an adjacent track.

A pivotal mount and a suspension system couple between a head/gimbal assembly and a vibration sensor. The suspension system produces the suspension force on the slider.

The vibration sensor is disposed on the pivotal mount and senses the vibration noise spectrum and the head-to-disc contact vibrations, including near-contact vibrations.

The vibration sensor has a sensor modal resonance, and the suspension system has a suspension modal resonance. The sensor and suspension modal resonances overlap one another to define a limited channel bandwidth for sensing the head-to-disc contact and near-contact vibrations. The limited channel bandwidth is spaced apart in frequency from the first and second local noise maxima to enhance a signal-to-noise ratio for the channel. The modal resonances increase the amplitude of transmitted vibrations.

Figure 1:
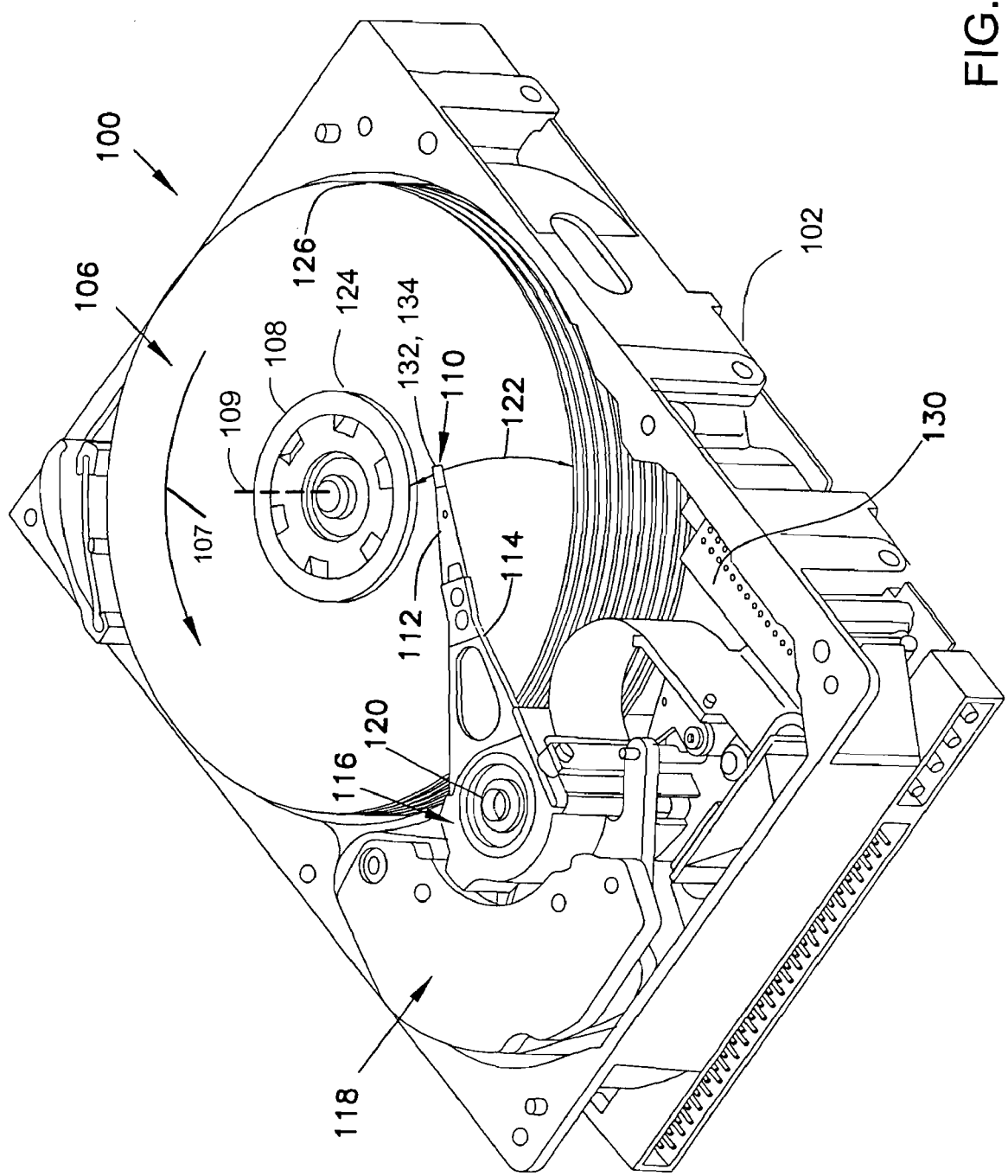
FIG. 1 is an isometric view of a disc drive.

FIG. 1 illustrates an oblique view of a disc drive 100 in which the presently disclosed channel is useful. Disc drive 100 includes a housing with a base 102 and a top cover (not shown). Disc drive 100 further includes a disc pack 106, which is mounted on a spindle motor (not shown) by a disc clamp 108. The spindle motor is driven by an electric pulse drive circuit (not shown) that produces local noise maxima that are added to the mechanical noise spectrum of disc drive 100. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of a pivotal mount (E block) 116. A head 132 and a heater 134 are disposed on each slider 110. The actuator shown in FIG. 1 is of the type known as a rotary moving coil actuator and includes a voice coil motor (VCM), shown generally at 118. Voice coil motor 118 rotates the pivotal mount 116 with its attached heads 110 about a pivot shaft 120 to position heads 110 over a desired data track of bit patterned media along an arcuate path 122 between a disc inner diameter 124 and a disc outer diameter 126. Voice coil motor 118 is driven by servo electronics 130 based on signals generated by heads 110 and a host computer (not shown in FIG. 1). The voice coil motor (VCM) 118 is a primary actuator that is driven by servo electronics (not shown) and that produces local noise maxima that are added to the mechanical noise spectrum of disc drive 100.

Figure 2:
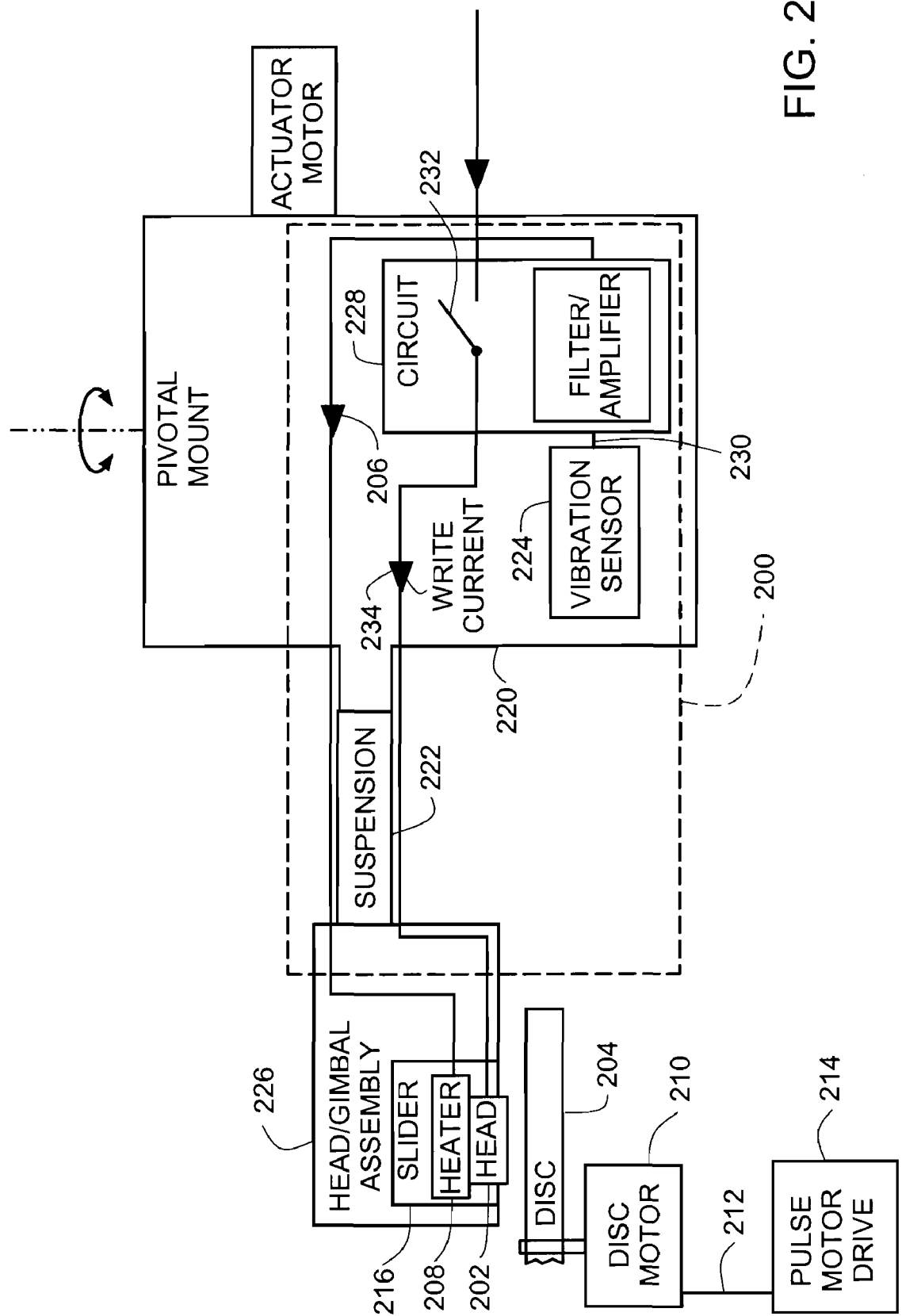
FIG. 2 illustrates a block diagram of a channel.

FIG. 2 illustrates a block diagram of a channel 200. The channel 200 is useful in a mass storage device, such as the disc drive shown in FIG. 1. The mass storage device produces a vibrational noise spectrum characterized by first and second local maxima. The vibrational noise spectrum is explained in more detail below in connection with an example shown in FIG. 4.

The channel 200 senses head-to-disc contact vibrations, including near contact vibrations. Head-to-disc contact vibrations occur when a head 202 contacts a disc 204. The channel 200 controls a switch 232 in a circuit 228. When head-to-disc vibrations that exceed a threshold are sensed by the channel 200, the switch 232 interrupts a write current 234. Interrupting the write current 234 prevents overwriting and destruction of data on adjacent tracks. The channel 200 controls a heater current 206 to heater 208 that is adjacent the head 202. Heat produced by the heater 208 controls adjustment of a head-to-disc spacing (thermal pole tip protrusion) to reduce head-to-disc contact.

A disc motor 210 spins one or more discs 204. The disc motor 210 receives an electric pulse drive output 212 from a pulse motor drive circuit 214. The motion provided by the disc motor 210 is a pulsed motion that contributes first and second local noise maxima to the vibration noise spectrum. The head 202 is spaced from the disc 204 by a fly height. The fly height is regulated by an upward aerodynamic lift force on a slider 216, and by a downward suspension force on the slider 216. The head 202 is disposed on the slider 216. The heater 208 adjacent the head 202 heats the head 202 to adjust the fly height of the head 202.

The channel 200 comprises a pivotal mount 220, a suspension system 222 and a vibration sensor 224. The pivotal mount 220 and the suspension system 222 couple between a head/gimbal assembly 226 and the vibration sensor 224. The suspension system 222 produces the downward suspension force.

The vibration sensor 224 is disposed on the pivotal mount 220 and senses the vibration noise spectrum and the head-to-disc contact vibrations, including near-contact vibrations.

The vibration sensor 224 has a sensor modal resonance, and the suspension system 222 has a suspension modal resonance. The sensor and suspension modal resonances overlap one another (along a frequency axis) to define a limited channel bandwidth for sensing the head-to-disc contact. The sensor modal resonance and suspension modal resonance are described in more detail below in connection with examples illustrated in FIG. 3. The limited channel bandwidth is described in more detail below in connection with an example illustrated in FIG. 4. The limited channel bandwidth is spaced apart in frequency from the first and second local noise maxima (along a frequency axis) to enhance a signal-to-noise ratio for the channel. In the example illustrated in FIG. 3, the limited channel bandwidth lies between the first and second local noise maxima. In the example illustrated in FIG. 12, the limited channel bandwidth lies below the first and second local noise maxima. In both examples, the limited channel bandwidth has a center frequency that is spaced apart in frequency from the center frequencies of the first and second local noise maxima. An exemplary position (in a frequency spectrum) of the limited channel bandwidth with respect to the first and second local noise maxima is described in more detail below in connection with the examples shown in FIG. 4.

According to one aspect, the channel 200 includes a circuit 228 that receives a sensor output 230 from the vibration sensor 224. The circuit 228 comprises the switch 232 that interrupts the write current 234 when vibration above a threshold is sensed by the vibration sensor 224. According to one aspect, the circuit 228 provides the current 206 to the heater 208. When head-to-disc contact vibrations are sensed by the vibration sensor 224, the circuit 228 adjusts the amplitude of the current 206 to increase pole-to-disc spacing to reduce contact.

In terms of transmission of mechanical vibration from the head-to-disc contact to the vibration sensor 224, the head/gimbal assembly 226, the suspension 222, the pivotal mount 220 and the vibration sensor 224 are arranged in cascade for such transmission. The head-to-disc contact vibration is amplified by the head/gimbal assembly resonance, which is, in turn, amplified by the suspension resonance, which is, in turn, amplified by the sensor resonance. The resonances are in an overlapping frequency range of limited channel bandwidth and function together as cascaded mechanical amplifier stages. The sensor output 230 of the resonant vibration sensor 224 is then filtered and amplified in circuit 228 to enhance signal to noise ratio.

Figure 3:
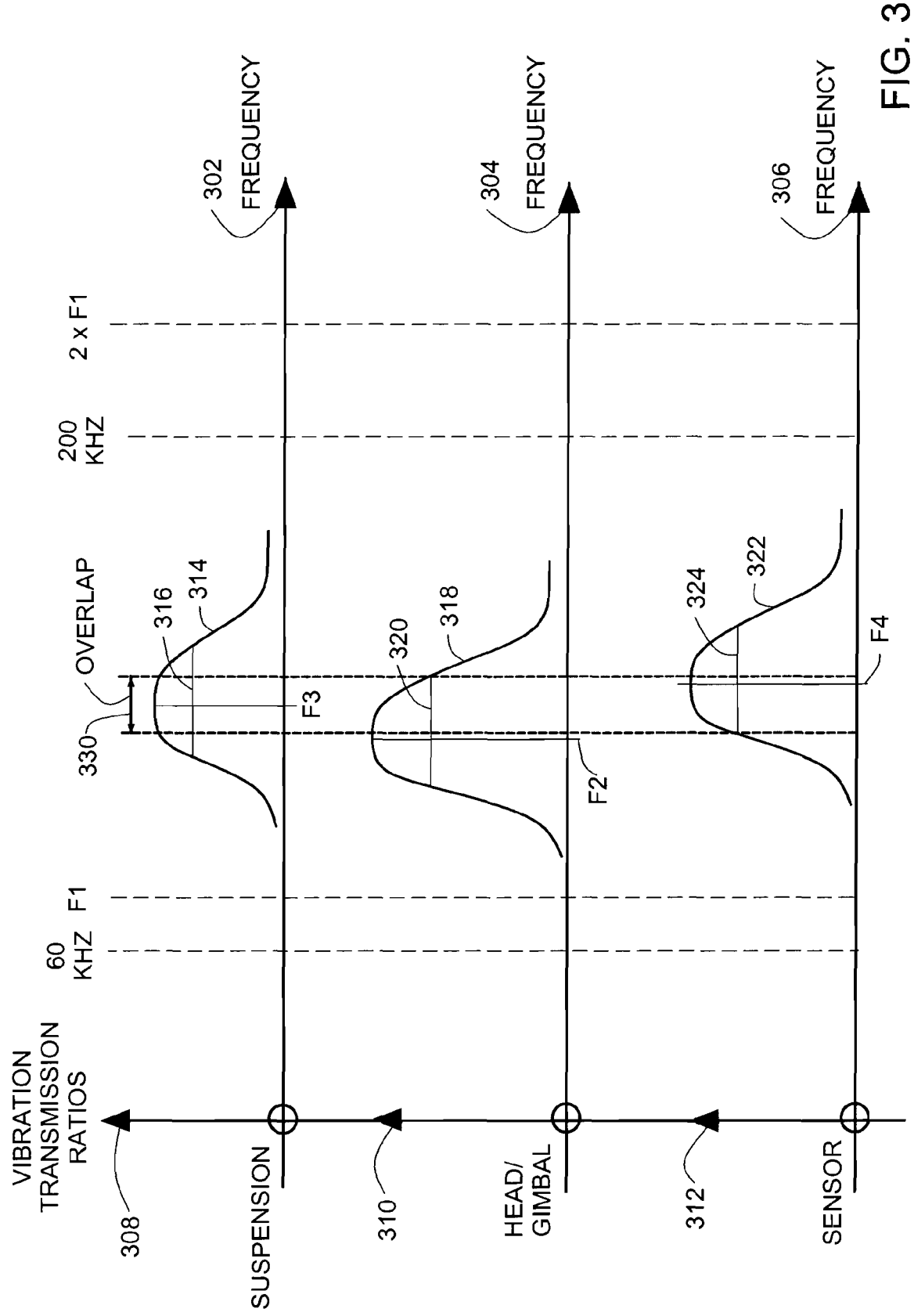
FIG. 3 illustrates exemplary modal resonances in a channel in which modal resonances are between first and second local noise maxima.

FIG. 3 illustrates exemplary modal resonances in a channel such as the channel 200 shown in FIG. 2. According to one aspect, FIG. 3 can be seen as timing diagram of a spectral analysis of vibration transmission ratios or gains of portions of the channel. In FIG. 3, horizontal time axes 302, 304, 306 represent frequency. Vertical axes 308, 310, 312 represent ratios of amplitudes of vibration outputs divided by amplitudes of vibration inputs for portions of the channel. A first gain axis 308 represents a vibration transmission ratio for a suspension. A second gain axis 310 represents a vibration transmission ratio for a head/gimbal assembly. A third gain axis 312 represents a vibration transmission ratio for a vibration sensor.

As illustrated in FIG. 3, a vibration transmission ratio for the suspension comprises a suspension modal resonance 314. The suspension modal resonance 314 comprises a 3 dB frequency bandwidth 316. A vibration transmission ratio for the head/gimbal assembly comprises a head/gimbal assembly modal resonance 318. The head/gimbal modal resonance comprises a 3 dB frequency bandwidth 320. A vibration transmission ratio for the vibration sensor comprises a vibration sensor modal resonance 322. The vibration sensor modal resonance 322 comprises a 3 dB frequency bandwidth 324. As illustrated at 330, the 3 dB bandwidths of the suspension, the head/gimbal assembly and the sensor all overlap one another to form a limited channel bandwidth 330 for sensing vibration.

According to one aspect, the suspension, the head/gimbal assembly and the sensor modal resonance bandwidths 316, 320, 324 closely coincide with one another in an overlapping frequency range. According to another aspect, the suspension, the head/gimbal assembly and the sensor modal resonance bandwidths 316, 320 and 324 are somewhat staggered in an overlapping frequency range of limited channel bandwidth as illustrated. According to yet another aspect, only one of the head/gimbal assembly and the suspension has an useful modal resonance at a useful frequency, however, the one useful modal resonance and vibration sensor modal resonance 314, 322 overlap to provide an overlapping frequency range of limited channel bandwidth. According to yet another aspect, the head/gimbal assembly does not have a modal resonance at a useful frequency, however the suspension and vibration sensor modal resonances 314, 322 overlap to provide an overlapping frequency range of limited channel bandwidth.

As illustrated in FIG. 3, modal resonance center frequencies F2, F3, F4 are between 60 kHz and 200 kHz. The modal resonance center frequencies F2, F3, F4 are between a fundamental frequency F1 of the pulse drive output 212 and a second harmonic (2×F1) of the pulse drive output 212. According to one aspect, the fundamental frequency F1 is adjusted in the design process such that the modal resonance center frequencies F2, F3, F4 lies between F1 and (2×F1). The modal resonance center frequencies F2, F3, F4 are all spaced apart in frequency from both the fundamental frequency F1 of the pulse drive and also the second harmonic (2×F1) of the pulse drive frequency. The overlap 330 of the frequencies F2, F3, F4 is spaced apart in frequency from frequency F1 and from frequency (2×F1).

Figure 4:
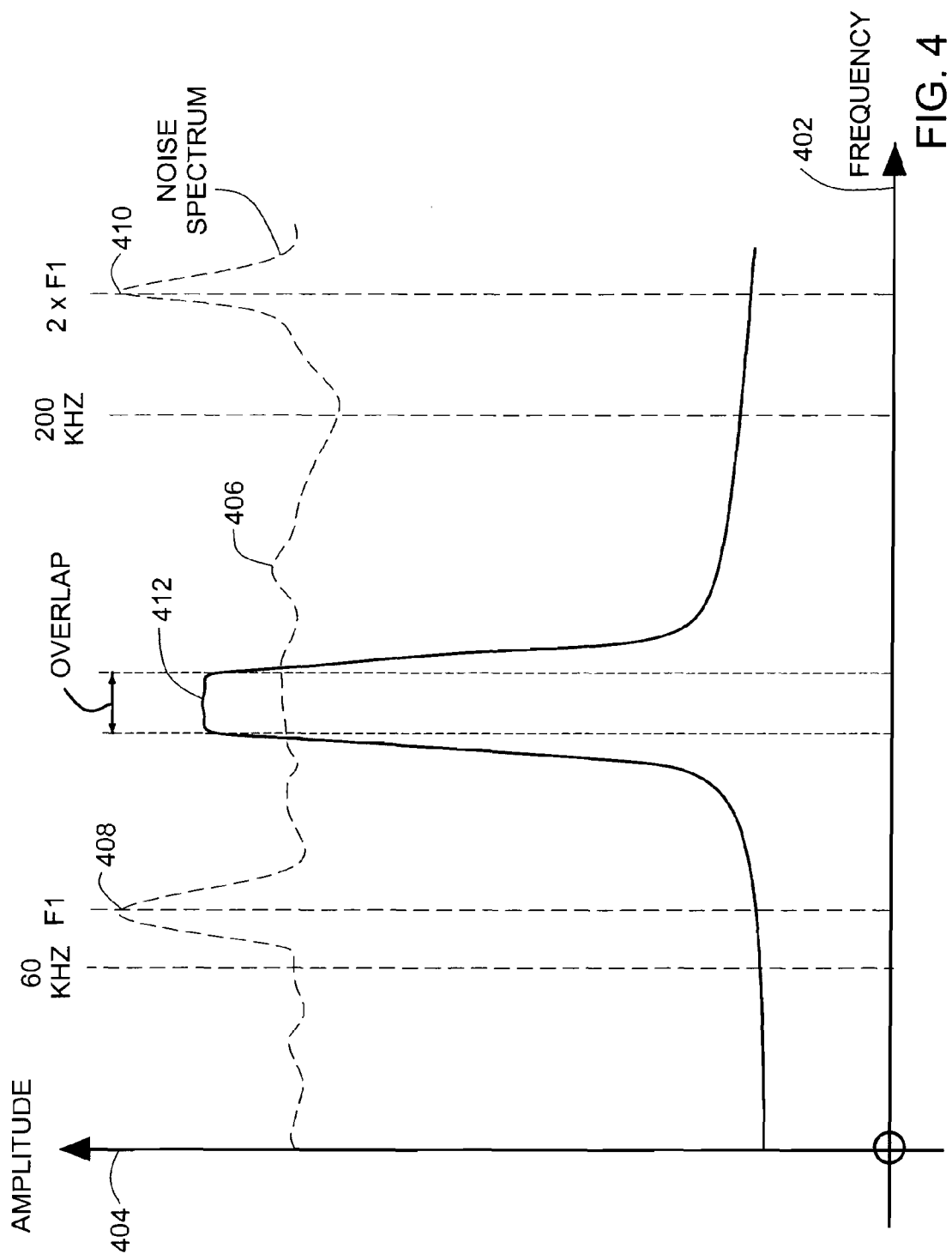
FIG. 4 illustrates a channel bandwidth as filtered by multiple modal resonances, and exemplary local maxima in a vibrational noise spectrum of a mass storage device.

FIG. 4 illustrates exemplary local maxima 408, 410 in a vibrational noise spectrum 406 of a mass storage device, for example the disc drive illustrated in FIG. 1. According to one aspect, FIG. 4 can be seen as timing diagram of a spectral analysis of the vibrational noise spectrum 406 and of a sensor output amplitude in a limited channel bandwidth 412 as filtered by multiple modal resonances. As illustrated, the limited channel bandwidth 412 is formed by staggered modal resonances of the channel and exhibits a relatively flat pass band 412 with low levels of ringing, and steep side skirts to reject out-of-bandwidth noise such as local noise maxima 408, 410. In FIG. 4, a horizontal time axes 402 represents frequency. A vertical axis 404 represents amplitudes of vibration output and noise. According to one aspect, the amplitude spectrum sensor output shown in FIG. 4 is generated by providing white vibration noise as a simulated input at a head.

Disc drive fly heights are becoming lower and areal densities are increasing with newer designs. Performance is improved by accurately sensing the near contact and contact fly height point for each head disc combination. The near or contact sensing is done with a vibration sensor mounted on a moving, pivotal mount. This vibration sensing on the moving, pivotal mount is used to set writer heater parameters both in the factory and the field. This vibration sensing can also be used to monitor and report and inadvertent contact detect events in the factory or the field.

According to one aspect, a high frequency vibration sensor is mounted on an E-block, and the resulting sensor signal output is processed in a preamplifier circuit package that is on the E-block. This is called an E-Block Modal Sensor (EBMS) based contact detect system since the resonance mode of the sensor is used to amplify the contact induced resonance modes of the head suspension. The EBMS system provides high speed since the head, the vibration sensor and the circuit are all interconnected by electrical leads with short lengths. The channel that senses contact and that controls heater current does not extend beyond the E-block, the suspension and the head.

To achieve the high signal-to-noise ratio desired for a production implementation of the EBMS sensor, an effective mechanical transmission of near contact and contact excitation energy from the head/gimbal to the sensor on the E-Block is provided. Effective transmission or coupling of contact vibration energy is provided by selecting an optimal EBMS sensor frequency, selecting a low noise motor PWM (Pulse Width Modulation) frequency and optimizing the head suspension design to match up in frequency with the EBMS sensor.

The suspension, head/gimbal assembly and load beam preferably resonate and transmit the desired contact frequency to the EBMS sensor mounted on the E-Block. Of the various available motor driver pulse width modulation (PWM) frequencies, one with a low base-line, non-contact noise spectrum is preferred to optimize contact detection signal- to-noise ratio.

To achieve the desired EBMS system signal-to-noise ratio for reliable contact detection, the sensor resonance frequency is selected, set or adjusted so it matches up with a suspension resonance. Also, both sensor and suspension resonance frequencies are preferably between the fundamental and higher harmonics of the noise spectrum. It is also desirable that the lowest baseline noise of the available pulse width modulation (PWM) frequencies of the disc drive motor driver be selected.

The use of PWM motor drivers for reduced disc drive power has a side effect of exciting the head disc assemblies (HDA) entire mechanical structure at the PWM frequencies. This includes excitation of the head air bearing and suspension or head disc interface (HDI). This excitation can be very high for some combinations of motor driver design, spindle motor design, drive rpm and specific PWM frequencies.

The resultant mechanical noise from the motor driver's excitation of the HDA and its HDI's can cause too low of contact detection signal-to-noise ratio to be useful for EBMS based drive level contact detection. The matching and positioning of sensor and suspension resonance frequencies relative to the motor driver PWM is useful in a field and/or factory contact detection system.

To enhance the contact detect signal of sensor, the resonance frequency of a standard small package piezoelectric shock sensor element is raised from a typical 20 to 30 kHz range up to a frequency selected in the 60 to 200 kHz range for the EBMS sensor. Instead of using the flat portion of the sensor transfer function, as used in shock sensor applications, the resonance peak of the shock sensor is used to dramatically amplify the contact response by matching the EBMS sensor resonance to the head suspension contact response frequency.

Figure 10:
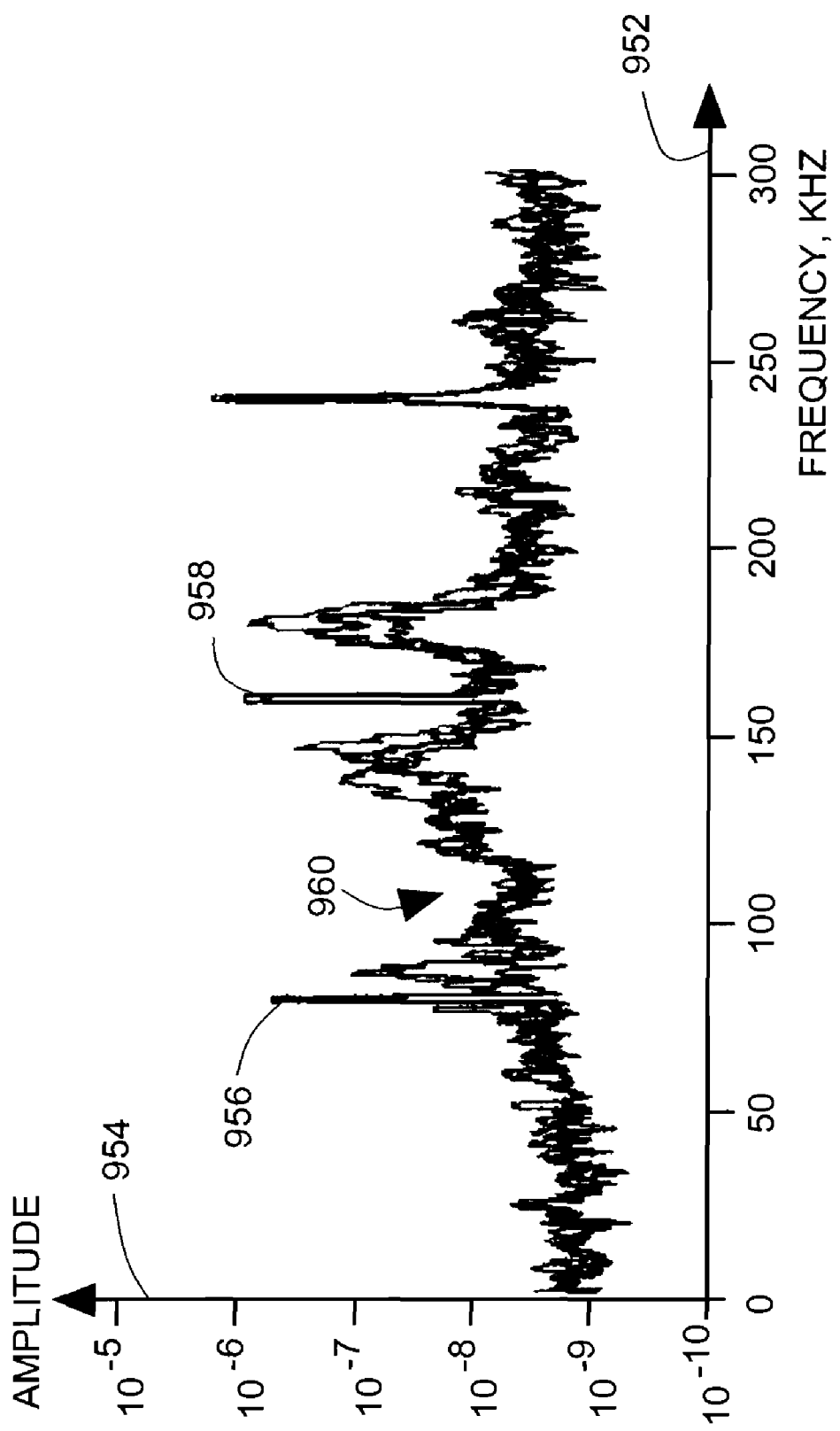
FIG. 10 illustrates a graph of vibration noise spectra in a disc drive.

The contact response function at drive level, when measured with the high frequency EBMS sensor, also picks up the PWM induced mechanical excitation of the HDI. These peaks of PWM induced HDI excitation are typically as high or higher than the contact detect suspension resonance that is amplified by being very close to the sensor resonance, as shown in FIG. 10. According to one aspect, high pass and low pass electronic filter/amplifiers in the pre-amp are used to eliminate some of the PWM induced noise peaks from the contact detect signal. The servo signal peaks would not be present with Pre-Amp based EBMS measurement, so do not affect contact detect S/N.

While FIG. 4 illustrates an overlap bandwidth 412 that lies between maxima 408 and 410, the overlap bandwidth can also lie below both maxima 408 and maxima 410 as described below in connection with FIG. 12. In both cases, modal resonances frequencies and overlap bandwidth frequencies 412 are spaced apart in frequency from the maxima 408, 410.

Figure 5:
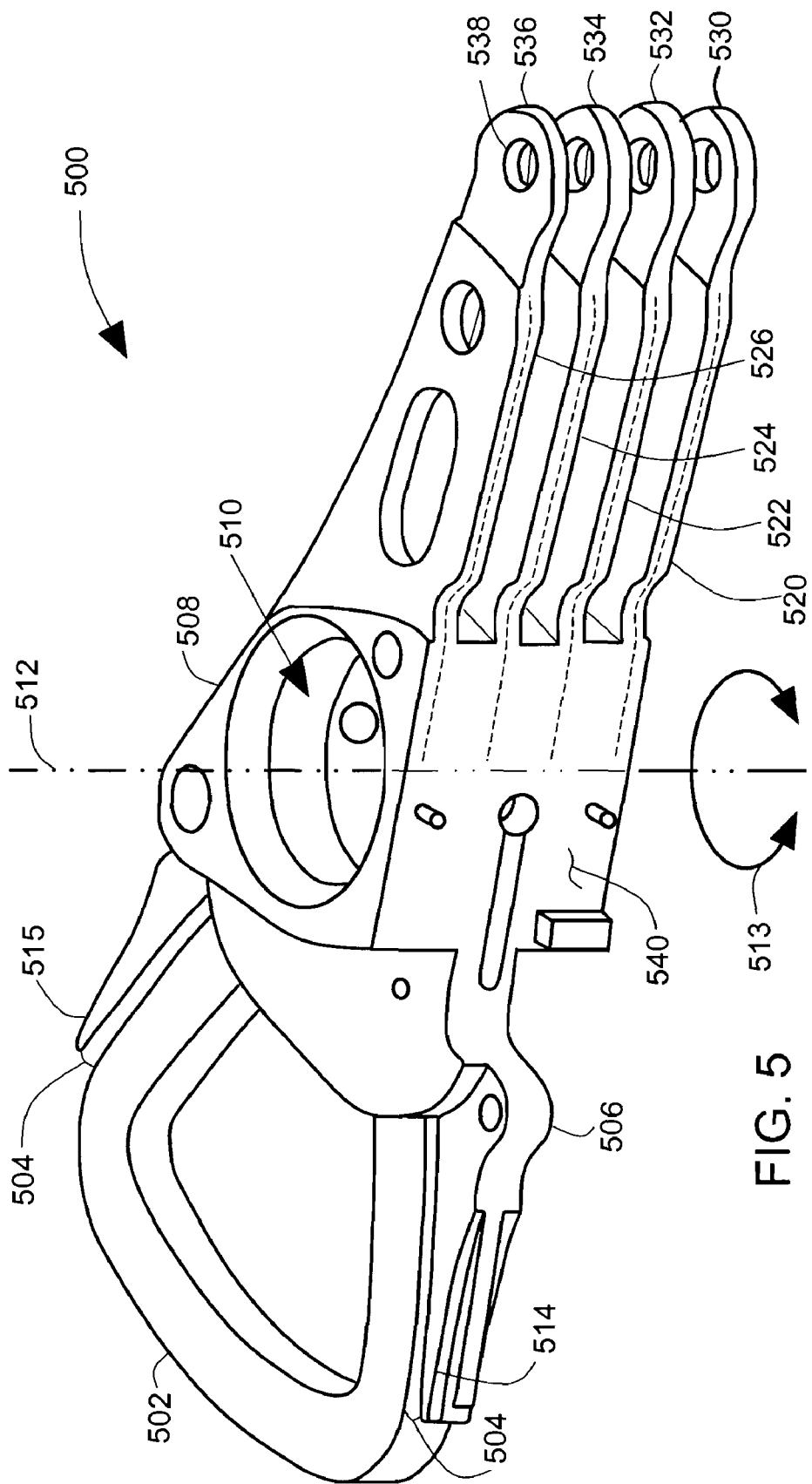
FIG. 5 illustrates a first subassembly that comprises a portion of a pivotal mount.

FIG. 5 illustrates a subassembly 500 that comprises a portion of a pivotal mount. The subassembly 500 is generally comparable to the E block 116 shown in FIG. 1. The subassembly 500 comprises a voice coil 502 that is rigidly attached by adhesive material 504 to mounting arms 514, 515 of an E block body 506. According to one aspect, the voice coil 502 comprises a coil of copper magnet wire, and the E block body 506 comprises a seamless aluminum component machined from an aluminum channel. The E block body 506 comprises an E block hub 508 that is joined to the mounting arms 514, 515. The E block hub 508 surrounds a main bore 510. The main bore 510 is shaped to receive bearings that are used for pivoting the subassembly 500 around a central pivotal axis 512. Once mounted, motion of the subassembly 500 is constrained to pivot rotationally around the central pivotal axis 512 as illustrated by arrow 513.

The E block body 506 comprises rigid track accessing arms 520, 522, 524, 526 that are rigidly attached to the E block hub 508 and that extend outwardly. The track accessing arms 520, 522, 524, 526 are spaced apart from one another for insertion between spaced apart storage media discs (such as disc pack 106 in FIG. 1). The track accessing arms 520, 522, 524, 526 terminate in corresponding suspension mounting tabs 530, 532, 534, 536. Each of the mounting tabs 530, 532, 534, 536 surrounds a mounting hole, such as mounting hole 538. The mounting holes are used for mounting a suspension system, described in more detail below in connection with examples in FIGS. 7, 8A and 8B.

The E block body 506 comprises a generally flat mounting surface 540. The surface 540 is useful for mounting an end of a flex circuit, also called a flexible printed circuit as described in more detail below in connection with an example in FIG. 6.

Figure 6:
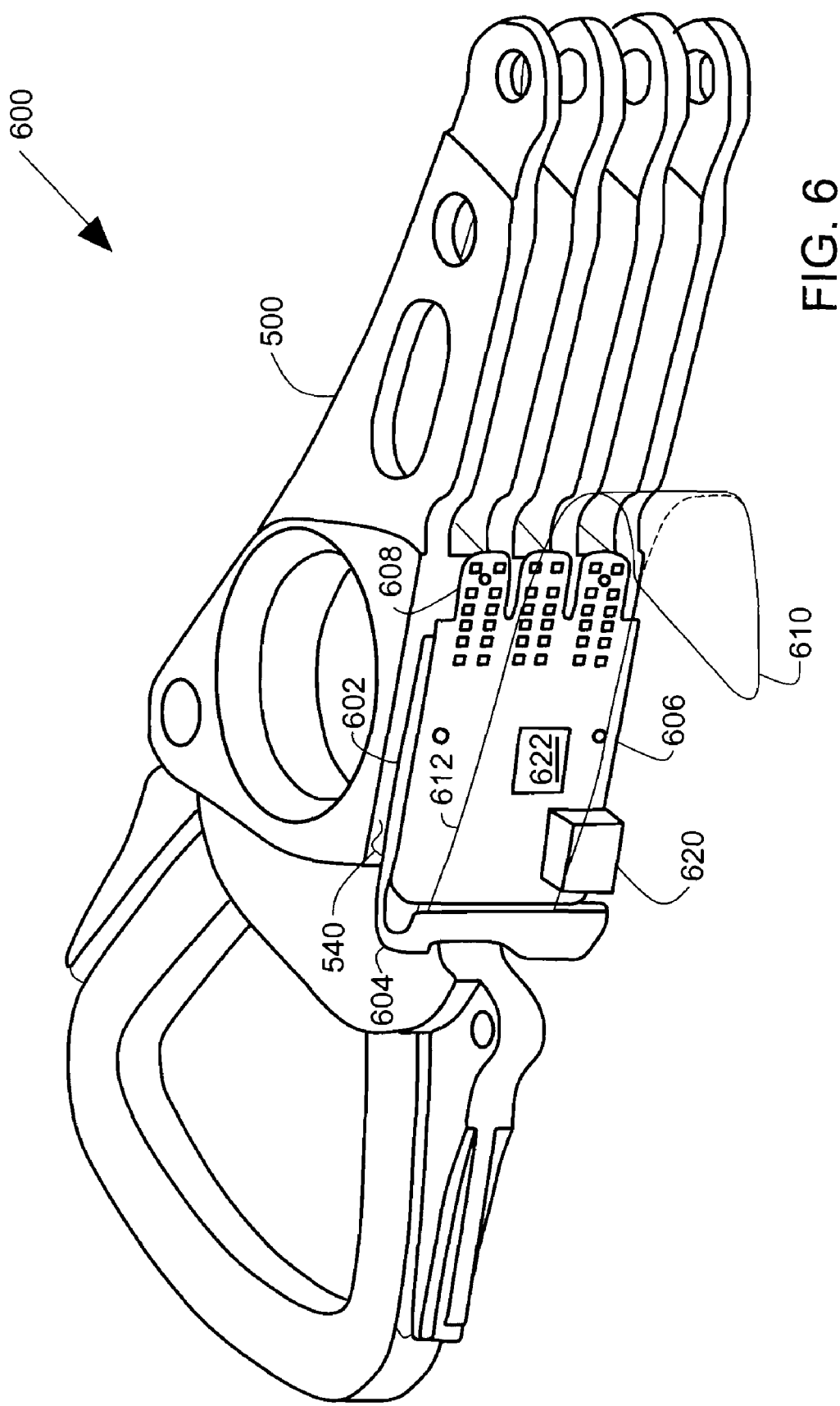
FIG. 6 illustrates a second subassembly that includes the first subassembly of FIG. 5.

FIG. 6 illustrates a second subassembly 600 that includes the subassembly 500 (FIG. 5). A plate 602 is mounted on the mounting surface 540 of the E block hub 508. The plate 602 has a curled end 604 that protrudes as illustrated to provide support and stress relief for a flex circuit 606. The flex circuit 606 provides multiple flexible electrical connections between electrical components that are mounted to the pivoting subassembly 500 ("live mounted components") and non-moving electrical components ("non-live mounted components") in a mass data storage device. The flex circuit 606 comprises a live mounted flex circuit end 608 that connects to live mounted suspension assemblies to complete electrical circuits. Suspension assemblies are described in more detail below by way of examples illustrated in FIGS. 7, 8A, 8B. The flex circuit 606 comprises a non-live mounted flex circuit end 610. The flex circuit 606 comprises a central flex circuit region 612 that flexes as the subassembly 500 pivots.

A vibration sensor 620 is live mounted to the live mounted flex circuit end 608. A circuit 622 is live mounted to the flex circuit end 608. The vibration sensor 620, the circuit 622, suspension systems (such as examples illustrated in FIGS. 7, 8A, 8B) and associated electrical interconnections form a channel that is live mounted. Connections of the channel are not required to pass through the lengthy flex circuit region 612. Connections of the channel are kept short, providing a fast response for the channel. According to one aspect, the vibration sensor 620 has a sensor modal resonance that can be set to a desired center frequency by selecting a commercially available vibration sensor that has a modal resonance at the desired frequency. According to another aspect, the vibration sensor 620 has a sensor modal frequency that is set to a desired sensor modal resonance by custom designing a vibration sensor for this application. According to yet another aspect the custom sensor modal resonance is adjusted by adjusting a moving mass and mass mounting spring shapes of internal structures of the vibration sensor.

Figure 7:
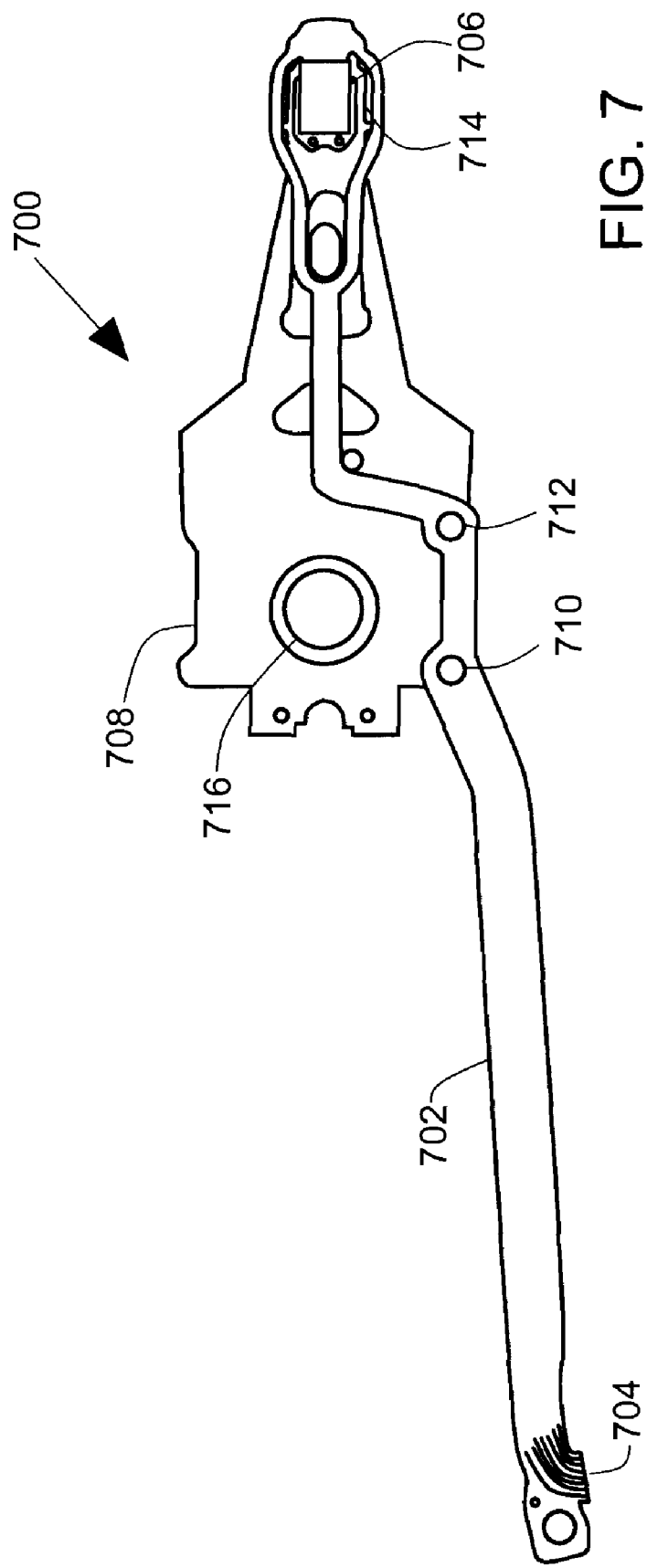
FIG. 7 illustrates a suspension system.

FIG. 7 illustrates a suspension system 700. The suspension system 700 comprises a suspension flex circuit 702 that extends from electrical contacts 704 to a slider 706 that is supported by the suspension system 700. The electrical contacts 704 connect, for example, to contacts on a flex circuit end 608 in FIG. 6.

The suspension system 700 comprises a load beam 708. According to one aspect, the load beam 708 comprises a stainless steel spring that provides a mechanical preload force to the slider 706. The slider 706 is flexibly mounted to the load beam 708 by a head/gimbal assembly 714. The suspension flex circuit 702 is secured to the load beam 708 at mounting rings 710, 712. The suspension system 700 comprises a mounting hole 716. The mounting hole 716 is mounted to a suspension mounting tab such as suspension mounting tab 536 in FIG. 5. According to one aspect, the mounting hole 716 is aligned with a mounting hole such as mounting hole 538 in FIG. 5, and connected by swaging. The suspension system 700 has a suspension modal resonance. According to one aspect, the suspension modal resonance is set or adjusted by adjusting the spring constant of the load beam 708. The spring constant is adjustable by selection of materials, tempering, thickness, size and shape of the load beam 708.

Figure 8A:
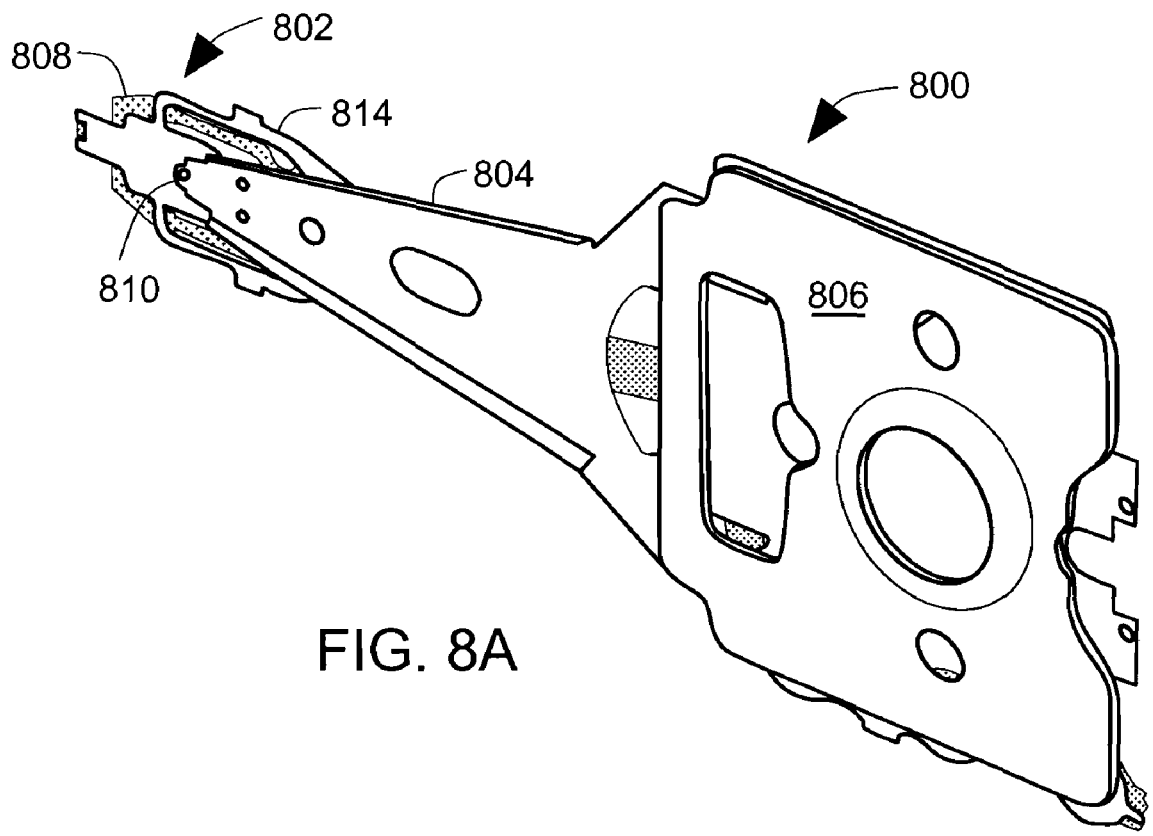
FIGS. 8A, 8B illustrate a suspension system coupled to a head gimbal assembly.
Figure 8B:
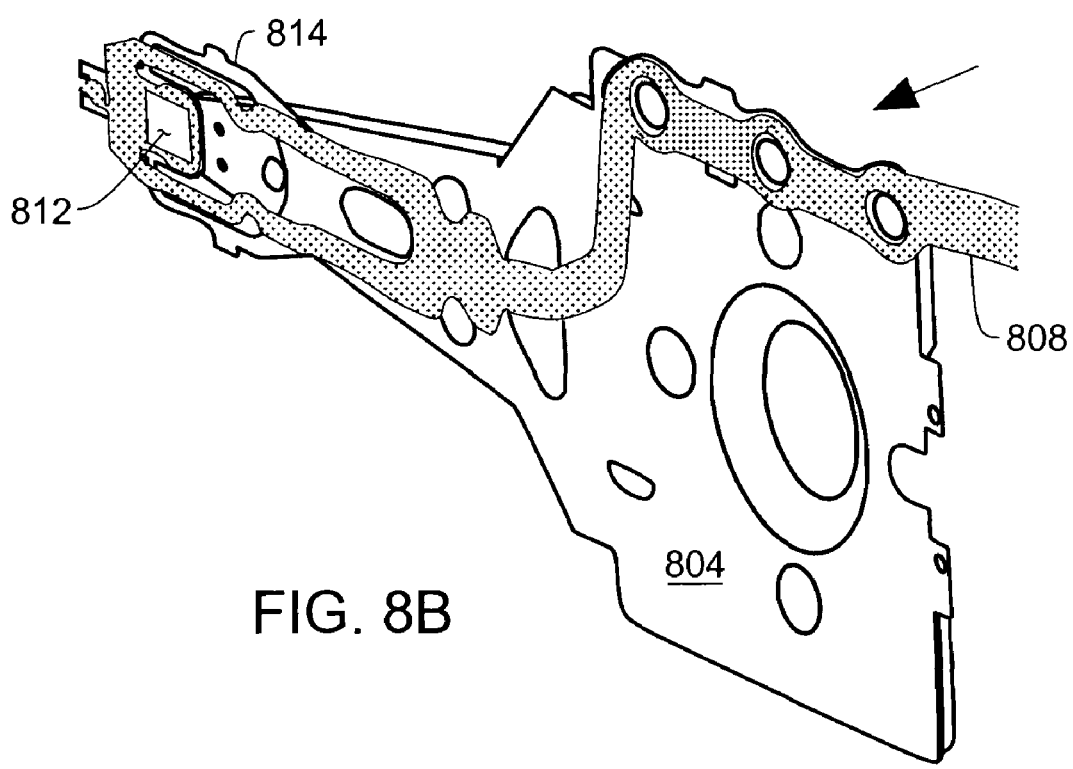

FIGS. 8A, 8B illustrate a suspension system 800 coupled to a head gimbal assembly 802. The suspension system 800 comprises a load beam 804, a mounting plate 806 and a suspension flex circuit 808. The load beam 804 includes a dimple 810 that exerts a load force on a slider 812. The head gimbal assembly 802 comprises the slider 812 and a gimbal spring 814. The gimbal spring 814 secures the slider 812 to the suspension system 800 and permits limited rotation of the head 812 about a pitch axis of the slider 812. The slider 812 has a head deposited on a trailing edge. The suspension system 800 has a suspension modal resonance that is adjusted by changes to the load beam 804 and also by the size and shape of the mounting plate 806. A modal resonance of the head gimbal assembly 802 is adjustable by selection of size, shape, material and tempering of the gimbal spring 814.

Figure 9:
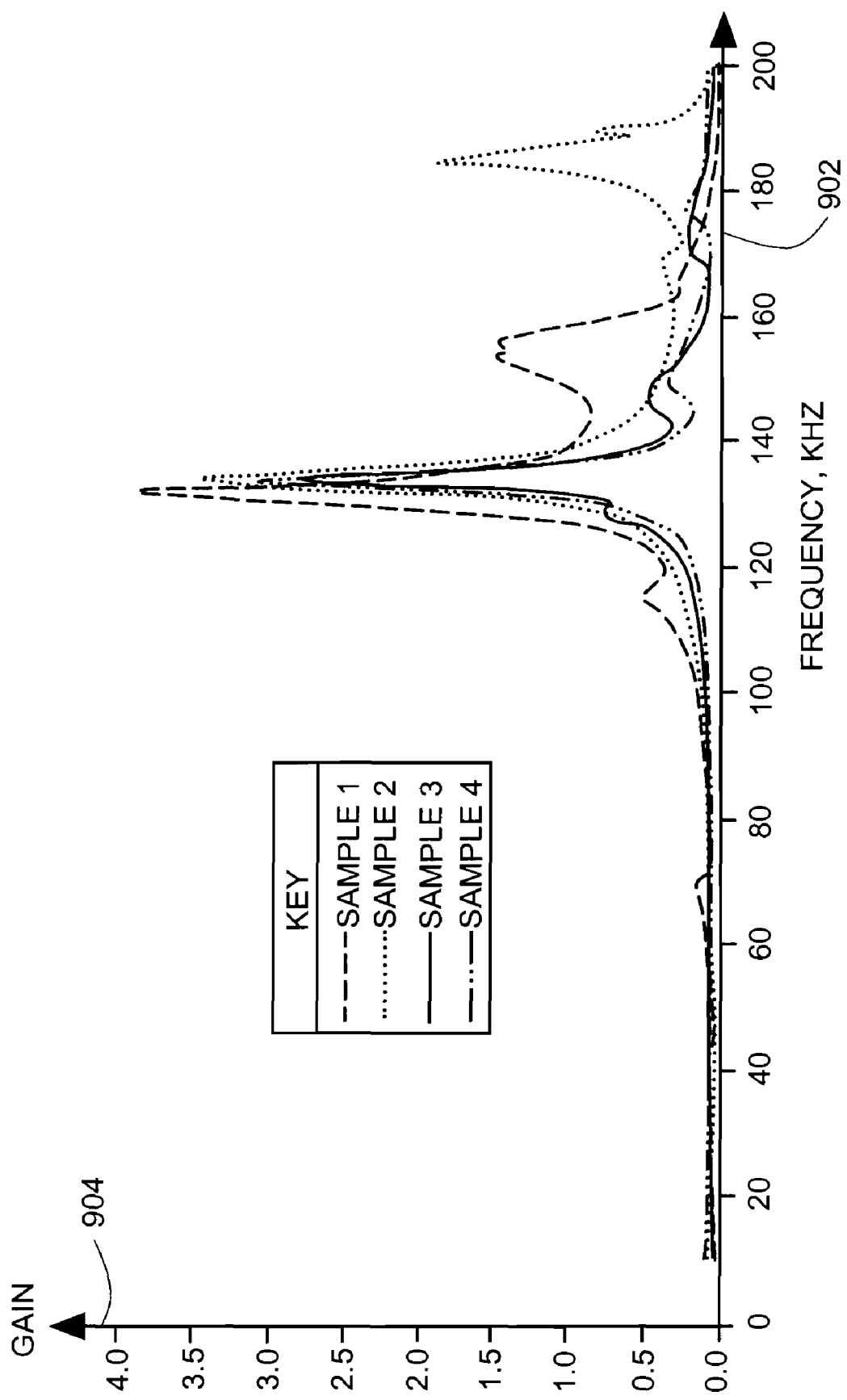
FIG. 9 illustrates a graph of gain of piezoelectric vibration sensors as a function of frequency.

FIG. 9 illustrates a graph of gain of sample piezoelectric vibration sensors as a function of frequency. A horizontal axis 902 represents frequency. A vertical axis 904 represents gain of the sample piezoelectric vibration sensors. An orientation of the a vibration sensitive axis of a vibration sensor can be adjusted relative to the E block to meet the needs of a particular application. While a preferred sensor orientation is shown in FIG. 5, the vibration sensors can alternatively be oriented at any angle according to the needs of the application. For the graph of FIG. 9, piezoelectric sensors are mounted on a flex circuit on an E block mounting surface such as E block mounting surface 540 in FIG. 5. The vibration sensors have a vibration sensitive axis that is parallel to the E block mounting surface and perpendicular to a pivotal axis such as pivotal axis 512 in FIG. 5. As shown in FIG. 9, the gains of the piezoelectric vibration sensors each have a modal resonance at approximately 130 kHz. There is a great increase in the gain at the modal resonance in comparison with the gain at lower frequencies.

FIG. 10 illustrates a graph of vibration noise spectra in a disc drive at temperatures of 5 degrees, 25 degrees and 60 degrees centigrade. A horizontal axis 952 represents frequency. A vertical axis 954 represents amplitude of vibration noise spectra. As can be seen in FIG. 10, there is a first local noise peak 956 at approximately 80 kHz and a second local noise peak 958 at approximately 160 kHz. There is a local noise minimum 960 in the range of about 110-130 kHz. Modal resonances for the channel can be selected in the range of 110-130 kHz in order to filter out and avoid the local noise peaks 956, 958.

Figure 11:
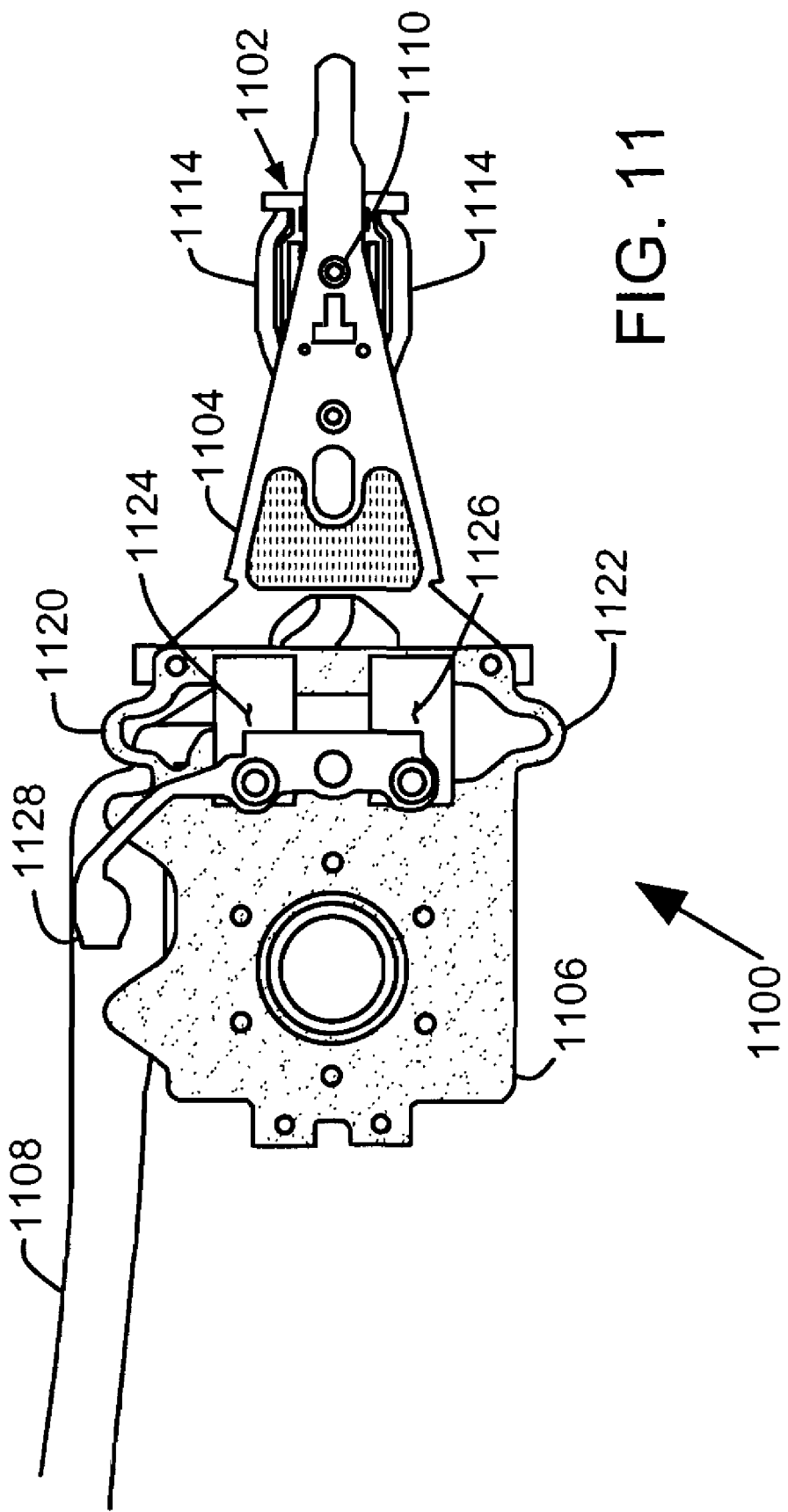
FIG. 11 illustrates a suspension assembly that includes piezo micro-actuators.

FIG. 11 illustrates a suspension system 1100 that is coupled to a head gimbal assembly 1102. The suspension system 1100 comprises a load beam 1104, a mounting plate 1106 and a suspension flex circuit 1108. The load beam 1104 includes a dimple 1110 that exerts a load force on a slider (not illustrated in FIG. 11). The mounting plate 1106 includes thinned sections 1120, 1122 that permit limited flexing of the mounting plate 1106 when a microaction force is applied. The thinned sections 1120, 1122 function as springs. Piezoelectric micro-actuators 1124, 1126 receive electrical signals by way of flex circuit 1128 and apply microactuation forces to flex the mounting plate 1106. Rotational microaction is applied to the mounting plate 1106 in combination with rotational positioning by a voice coil motor (such as voice coil motor 118 in FIG. 1) to accurately position the head over a desired track on a disk. The microactuation comprises a low mass actuator and provides more rapid rotation than movement of the voice coil motor. The microactuation system has a limited range of rotational motion. The piezoelectric microactuators 1124, 1126 are mechanically rigid elements that bridge the thinned sections 1120, 1122 and prevent undesired flexing of the thinned sections 1120, 1122 when the suspension assembly 1100 is externally accelerated due to voice coil actuation or vibration.

The head gimbal assembly 1102 comprises the slider and a gimbal springs 1114. The gimbal springs 1114 secure the slider to the suspension system 1100 and permits limited rotation of the head about a pitch axis of the slider. The slider has a head deposited on a trailing edge.

The suspension system 1100 has a suspension modal resonance that is adjusted by changes to the load beam 1104 and also by the size and shape of the mounting plate 1106. A modal resonance of the head gimbal assembly 1102 is adjustable by selection of size, shape, material and tempering of the gimbal springs 1114. A microactuator driver provides secondary positioning control and is driven by servo electronics (not shown) that produces local noise maxima that are added to the mechanical noise spectrum of the disc drive.

Figure 12:
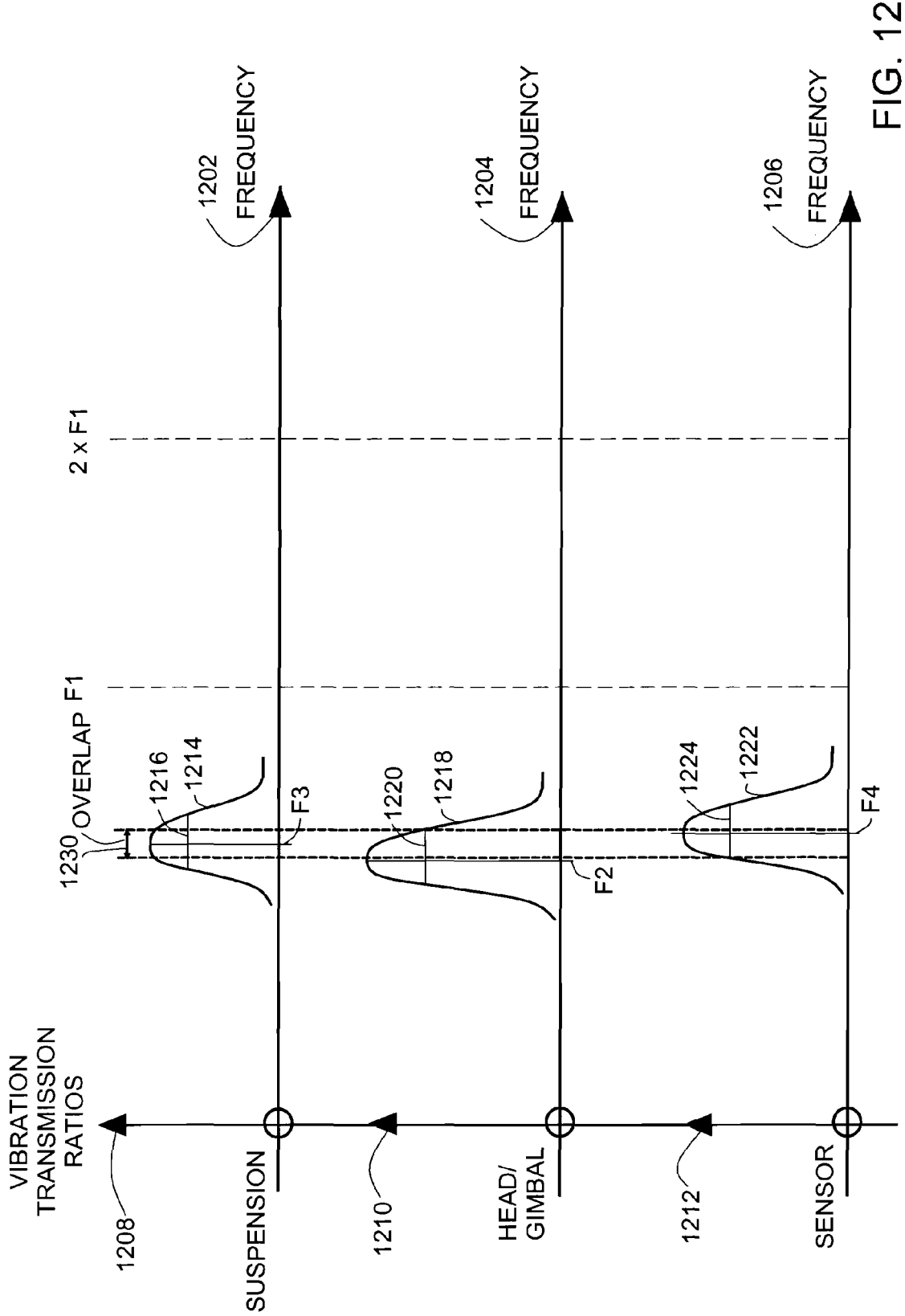
FIG. 12 illustrates exemplary modal resonances in a channel in which modal resonances are below first and second local noise maxima.

FIG. 12 illustrates exemplary modal resonances for an alternative embodiment in a channel such as the channel 200 shown in FIG. 2. In this alternative embodiment, the pulse width modulation fundamental frequency F1 is greatly increased. According to one aspect the frequency F1 in this alternative embodiment is in the range of about 129 kHz and modal resonances are adjusted or set in the range of about 90 kHz to 100 kHz. According to one aspect, FIG. 12 can be seen as timing diagram of a spectral analysis of vibration transmission ratios or gains of portions of the channel. In FIG. 12, horizontal time axes 1202, 1204, 1206 represent frequency. Vertical axes 1208, 1210, 1212 represent ratios of amplitudes of vibration outputs divided by amplitudes of vibration inputs for portions of the channel. A first gain axis 1208 represents a vibration transmission ratio for a suspension. A second gain axis 1210 represents a vibration transmission ratio for a head/gimbal assembly. A third gain axis 1212 represents a vibration transmission ratio for a vibration sensor.

As illustrated in FIG. 12, a vibration transmission ratio for the suspension comprises a suspension modal resonance 1214. The suspension modal resonance 1214 comprises a 3 dB frequency bandwidth 1216. A vibration transmission ratio for the head/gimbal assembly comprises a head/gimbal assembly modal resonance 1218. The head/gimbal modal resonance comprises a 3 dB frequency bandwidth 1220. A vibration transmission ratio for the vibration sensor comprises a vibration sensor modal resonance 1222. The vibration sensor modal resonance 1222 comprises a 3 dB frequency bandwidth 1224. As illustrated at 1230, the 3 dB bandwidths of the suspension, the head/gimbal assembly and the sensor all overlap one another to form a limited channel bandwidth 1230 for sensing vibration.

According to one aspect, the suspension, the head/gimbal assembly and the sensor modal resonance bandwidths 1216, 1220, 1224 closely coincide with one another in an overlapping frequency range. According to another aspect, the suspension, the head/gimbal assembly and the sensor modal resonance bandwidths 1216, 1220 and 1224 are somewhat staggered in an overlapping frequency range of limited channel bandwidth as illustrated. According to yet another aspect, the head/gimbal assembly does not have a modal resonance at a useful frequency, however the suspension and vibration sensor modal resonances 1214, 1222 overlap to provide an overlapping frequency range of limited channel bandwidth.

As illustrated in FIG. 12, modal resonance center frequencies F2, F3, F4 are below a fundamental frequency F1 of the pulse drive output 212 and also below a second harmonic (2×F1) of the pulse drive output 212. According to one aspect, the fundamental frequency F1, F2, F3 are adjusted in the design process such that the modal resonance center frequencies F2, F3, F4 lie below both F1 and (2×F1).

Example of EBMS PWM Frequency Selection

An example of selection of a motor driver's PWM lower and upper limits for an example combination of a drive with a suspension follows. The allowable PWM induced mechanical excitation upper frequency limit is found by starting at the 140 kHz suspension mid frequency contact response and a matching sensor mounted frequency, subtracting 15 kHz for half the sensor resonance variability and 12 kHz for sensor resonance amplification peak half width. The resultant PWM induced mechanical excitation upper frequency limit is 113 kHz. Using the single measurement of PWM induced mechanical excitation, the 86 k Hz first harmonic peak frequency spread of about 5 k Hz, half of that gives a PWM target upper frequency of less than 108 k Hz. This provides adequate design margin with an 86 k PWM frequency.

The high second harmonic issue with some motor driver frequencies sets the lower PWM induced mechanical excitation frequency limit. With a 140 kHz mounted sensor and adding 15 kHz for sensor variability and the 12 kHz for sensor peak half width, the resultant PWM induced mechanical excitation upper frequency limit of 167 kHz. Again using the single measurement of PWM induced mechanical excitation at 172 kHz, the second harmonic peak frequency spread is about 8 kHz, half of that gives a lower frequency limit of half of 163 kHz or 81.5 kHz.

Example of Suspension Design for Improved EBMS S/N

The head suspension, especially the load beam and gimbal have a structural response at the target frequency of the EBMS sensor. Since the EBMS sensor is mounted on the E-Block near its rear face, the contact detect induced modal energy first transmits from the head disc interface through the slider to the gimbal, then through the gimbal to the load beam and through a swage joint of the load beam base plate to the E-Block arm. The connection of this contact energy to the E-Block arm is sufficient to ensure that this energy reaches and excites the EBMS sensor mounted on the E-Block main body. The E-Block arm and main body are machined from one piece of aluminum extrusion.

The design of the suspension, gimbal and load beam have modes in the target frequency range of the EBMS sensor. With sufficient care in suspension design adequate EBMS contact S/N can be obtained by small optimizations of the suspension load beam and gimbal. Some effective gimbal modifications that shift modal resonance are narrowing and widening of the gimbal struts. For the load beam, modal resonance can be shifted by narrow side angles and thicker load beam material.

It is to be understood that even though numerous characteristics and advantages of various aspects of the channel have been set forth in the foregoing description, together with details of the structure and function of various embodiments of the channel, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the mass storage device while maintaining substantially the same functionality without departing from the scope and spirit of the present invention.

What is claimed is:

1. A channel that senses head-to-disc contact vibrations for use in a mass storage device producing a vibrational noise spectrum characterized by first and second local maxima, the channel comprising:
   a suspension system to suspend a head in relation to a disc, the suspension system having a suspension modal resonance spaced apart in frequency from the first and second local maxima; and
   a vibration sensor coupled to sense head-to-disc contact vibrations through the suspension system, the vibration sensor having a sensor modal resonance spaced apart in frequency from the first and second local maxima and overlapping with the suspension modal resonance.

2. The channel of claim 1, further comprising:
   a pivotal mount that couples the head-to-disc contact vibrations from the suspension system to the vibration sensor.

3. The channel of claim 2, further comprising:
   a heater disposed on the head; and
   a circuit disposed on the pivotal mount that receives a sensor output from the vibration sensor and that provides a heater current to the heater.

4. The channel of claim 3 wherein the circuit comprises a filter/amplifier with a pass band that is aligned with the suspension modal resonance and the sensor modal resonance.

5. The channel of claim 1, further comprising a switch that interrupts a write current to the head when the vibration sensor senses head-to-disc contact vibrations that exceed a threshold.

6. The channel of claim 1 wherein the vibration sensor comprises a sensor modal resonance adjustment that is adjusted so that the sensor modal resonance overlaps the suspension modal resonance.

7. The channel of claim 1, further comprising:
   an electric pulse motor drive that drives the disc, and the electric pulse motor drive generates the first and second local maxima.

8. The channel of claim 1, further comprising:
   a head/gimbal assembly that includes the head, the head/gimbal assembly having a head/gimbal assembly modal resonance that overlaps the suspension modal resonance.

9. The channel of claim 8, wherein the head/gimbal assembly modal resonance overlaps the sensor modal resonance.

10. A channel that senses head-to-disc contact vibrations for use in a mass storage device producing a vibrational noise spectrum characterized by first and second local maxima, the channel comprising:
    a suspension system that couples between a head and a pivotal mount;
    a vibration sensor that senses the head-to-disc contact vibrations coupled through the suspension system and that senses the vibrational noise spectrum; and
    the vibration sensor having a sensor modal resonance, the suspension system having a suspension modal resonance; and the sensor and suspension modal resonances that overlap one another and that are spaced apart in frequency from the first and second local maxima to define a limited channel bandwidth for sensing the head-to-disc contact vibrations.

11. The channel of claim 10, further comprising:
    a circuit disposed on the pivotal mount and comprising a switch that interrupts a write current to the head when the vibration sensor senses head-to-disc contact vibrations that exceed a threshold.

12. The channel of claim 11, further comprising:
    a heater disposed on the head; and
    the circuit receives a sensor output from the vibration sensor and provides a current to the heater that controls a head to disc spacing.

13. The channel of claim 10, further comprising:
    an electric pulse motor drive that drives a disc, and the electric pulse motor drive generates the first and second local maxima.

14. The channel of claim 10, further comprising:
    a head/gimbal assembly that includes the head, the head/gimbal assembly having a head/gimbal assembly modal resonance that overlaps the suspension modal resonance.

15. The channel of claim 14, wherein the head/gimbal assembly modal resonance overlaps the sensor modal resonance.

16. A channel that senses head-to-disc contact vibrations for use in a mass storage device producing a vibrational noise spectrum characterized by first and second local maxima, the channel comprising:
    a head, a pivotal mount, and a suspension system that couples between the head and the pivotal mount;
    a vibration sensor on the pivotal mount that senses the head-to-disc contact vibrations and the vibration noise spectrum and that provides a sensor output;
    the vibration sensor and suspension system having a mechanical modal resonance that defines a limited channel bandwidth spaced apart in frequency from the first and second local noise maxima; and
    a circuit disposed on the pivotal mount that receives the sensor output and that comprises a switch that interrupts a write current to the head when the vibration sensor senses head-to-disc contact vibrations that exceed a threshold.

17. The channel of claim 16, wherein the circuit provides a current to a heater that controls a head-to-disc spacing.

18. The channel of claim 16 wherein the circuit comprises a filter/amplifier with an electrical pass band that is aligned with the limited channel bandwidth.

19. The channel of claim 16, further comprising:
    an electric pulse motor drive that drives the disc, and the electric pulse motor drive generates the first and second local maxima.

20. The channel of claim 16, further comprising:
    a head/gimbal assembly that includes the head, the head/gimbal assembly having a head/gimbal assembly modal resonance that overlaps the suspension modal resonance.

* * * * *